(12) United States Patent
Blackwell

(10) Patent No.: US 12,203,260 B2
(45) Date of Patent: Jan. 21, 2025

(54) BUILDING ASSEMBLY AND A METHOD OF ENABLING CAMPING

(71) Applicant: Liam Blackwell, San Anselmo, CA (US)

(72) Inventor: Liam Blackwell, San Anselmo, CA (US)

(73) Assignee: Liam Blackwell, San Anselmo, CA (US)

( * ) Notice: Subject to any disclaimer, the term of this patent is extended or adjusted under 35 U.S.C. 154(b) by 222 days.

(21) Appl. No.: 17/633,469

(22) PCT Filed: Aug. 6, 2020

(86) PCT No.: PCT/EP2020/072209
§ 371 (c)(1),
(2) Date: Feb. 7, 2022

(87) PCT Pub. No.: WO2021/023846
PCT Pub. Date: Feb. 11, 2021

(65) Prior Publication Data
US 2022/0282472 A1 Sep. 8, 2022

(30) Foreign Application Priority Data
Aug. 6, 2019 (GB) ..................................... 1911255

(51) Int. Cl.
E04B 1/00 (2006.01)
E04H 1/02 (2006.01)
E04H 15/24 (2006.01)

(52) U.S. Cl.
CPC ............. *E04B 1/0015* (2013.01); *E04H 1/02* (2013.01); *E04H 15/24* (2013.01)

(58) Field of Classification Search
CPC ....... E04B 1/0015; E04B 1/0007; E04H 1/02; E04H 15/24; E04H 15/02
See application file for complete search history.

(56) References Cited

U.S. PATENT DOCUMENTS 880,542 A * 3/1908 Kitchen .................... F24D 5/00
122/225 F
3,007,212 A 11/1961 Gazin
(Continued)

FOREIGN PATENT DOCUMENTS

DE 202014004059 U1 8/2015
FR 2589899 A1 5/1987
(Continued)

OTHER PUBLICATIONS

UKIPO Search Report dated Jan. 27, 2020, for Application No. GB1911255.6.
(Continued)

*Primary Examiner* — Patrick J Maestri
(74) *Attorney, Agent, or Firm* — Conley Rose, P.C.

(57) ABSTRACT

The invention provides a building assembly comprising a subterranean cellar defining a space to be formed under the ground, the cellar having a ceiling including a first opening defining an access region for a staircase to connect the ground of the subterranean cellar, when in situ, with the surface of the ground above the cellar; and a heat control device having a heat transfer mechanism to provide heat from the cellar to a region on the ground above the cellar.

19 Claims, 5 Drawing Sheets

(56) References Cited

U.S. PATENT DOCUMENTS

| | | | | | |
|---|---|---|---|---|---|
| 3,986,306 | A | * | 10/1976 | Trannoy | E04B 1/10 52/234 |
| 4,625,468 | A | * | 12/1986 | Hampel | E04H 15/56 135/94 |
| 4,631,872 | A | * | 12/1986 | Daroga | A62B 13/00 165/45 |
| 4,996,970 | A | * | 3/1991 | Legare | A45F 3/04 126/210 |
| 5,085,446 | A | * | 2/1992 | Hoffman | B62B 13/16 135/901 |
| 2007/0039715 | A1 | * | 2/2007 | Brett | F24F 5/0046 165/45 |
| 2016/0160515 | A1 | | 6/2016 | Wallance | |

FOREIGN PATENT DOCUMENTS

| | | | |
|---|---|---|---|
| GB | 2572987 | A | 10/2019 |
| KR | 1020180067065 | A | 6/2018 |
| WO | 2015190634 | A1 | 12/2015 |

OTHER PUBLICATIONS

International Search Report and Written Opinion dated Nov. 23, 2020, for Application No. PCT/EP2020/072209.

* cited by examiner

BUILDING ASSEMBLY AND A METHOD OF ENABLING CAMPING

CROSS-REFERENCE TO RELATED APPLICATIONS

This application is a 35 U.S.C. § 371 national stage application of PCT/EP2020/072209 filed Aug. 6, 2020, entitled "A Building Assembly and a Method of Enabling Camping", which claims priority to United Kingdom patent application No. GB1911255.6 filed Aug. 6, 2019, entitled "A Building Assembly and a Method of Enabling Camping", both of which are hereby incorporated herein by reference in their entirety.

The present invention relates to a building assembly and a method of enabling camping.

Camping has always been a popular pastime. It provides an enjoyable and potentially cost-effective way of enjoying a holiday in an outdoor environment. Typically, camping is done on a campsite and involves a user erecting or pitching a tent which they will use as their place of residence whilst camping.

Camping typically involves a significant amount of equipment since the various articles that are required in everyday life must typically be taken by a camper to the campsite for the duration of the camping trip. This might include, for example, kitchen equipment, clothes and of course the tent itself. It is not uncommon for people to arrive at a campsite in some form of vehicle such as a car in which the significant amounts of equipment have been carried.

In other words, then, it is typical that to arrive at a campsite a user will have had to travel in a car or some other such vehicle. When camping, the presence of the vehicle next to the tent can affect negatively the camper's feeling of isolation and connection to nature.

Systems exist that involve the use of subterranean spaces or volumes sometimes associated with spaces of accommodation above the ground. Examples are included in U.S. Pat. No. 3,007,212, US2016/160515, GB2572987, WO2015/190634, DE202014004059 and KR1020180067065.

According to a first aspect of the present invention, there is provided a building assembly comprising a subterranean cellar defining a space to be formed under the ground, the cellar having a ceiling including; a first opening defining an access region for a staircase to connect the ground of the subterranean cellar, when in situ, with the surface of the ground above the cellar; and a heat control device having a heat transfer mechanism to provide heat from the cellar to a region on the ground above the cellar.

The invention provides an assembly in which a cellar is provided beneath a region of ground upon which a tent can be erected. This provides a space (within the cellar) for the parking of a vehicle that a user has used to reach the site of camping. The vehicle will not then be visible from the ground surface near the tent. A user will thus have had the convenience of being able to travel to the site of camping, together with the benefit of having their vehicle nearby should it be needed, without its presence affecting negatively the local view and the feeling of closeness to nature.

In an embodiment, the building assembly comprises kitchen facilities provided within the cellar. The presence of a cellar beneath the location of a tent means that facilities such as a kitchen can be provided which is convenient and helpful to a camper. It means that a user whilst still camping and sleeping in a tent, nonetheless, has the ability to prepare food in what might be a considered a more substantial or proper kitchen.

In an embodiment, the building assembly comprises bathroom facilities provided within the cellar. Similar advantages as those described above with respect to the kitchen apply correspondingly to the provision of bathroom facilities within the cellar.

In an embodiment, the building assembly comprises an upper staircase access frame, defining the access region for the staircase.

In an embodiment, the building assembly comprises a staircase that extends from a floor of the cellar to the first opening thereby enabling a user to climb between the cellar and the ground surface above.

In an embodiment, the heat control device comprises a hot air or hot water supply system. Providing a heat control device, such as a hot air or water supply system, means that a tent above the ground can easily and efficiently be heated. When camping in winter the temperatures of the environment can be prohibitively cold and can cause genuine discomfort. So much so that people may actually be dissuaded from camping during the season at all. By providing a cellar with a heater such as a hot air or water heater this problem is addressed. Furthermore, there is no need to provide the heater itself within the tent which can cause problems or even act as a hazard in the form of a fire risk.

In an embodiment, the building assembly comprises a frame, the frame including prefabricated panels for assembly on an excavated site. The frame may be permanently positioned within the ground defining the dimensions and structure of the cellar. The frame may be formed of steel beams or concrete or other such prefabricated panels of material. It will be appreciated that the construction will need to be strong enough to support the tent and users when present above it.

In an embodiment, the building assembly comprises a tent for arrangement on the ground above the cellar when in situ, wherein the tent has a ground covering member with an opening providing access to the staircase. The ground covering member can be a soft and flexible water-impermeable ground sheet, or it can be a solid rigid construction defining a corresponding rigid floor surface for the tent. In some embodiments, the ground covering member is a modular construction which enables easy transportation and assembly thereof.

Preferably, the building assembly comprises a siding to define an edge of the tent.

Preferably, at least part of the siding is water resistant.

Preferably, the siding is formed of a water resistant material.

Preferably, the siding is formed of a metal at least part coated in a water resistant material.

Preferably, the heat control device includes a heat exchanger.

Preferably, the heat exchanger is a ground based heat exchanger.

Preferably, the heat control device includes a reversible fan.

According to a second aspect of the present invention, there is provided a method of enabling camping, the method comprising providing a building assembly including a subterranean cellar defining a space to be formed under the ground, the cellar having a ceiling including; a first opening defining an access region for a staircase to connect the ground of the subterranean cellar, when in situ, with the surface of the ground above the cellar; and providing a heat control device within the cellar having a heat transfer mechanism to provide heat from the cellar to a region on the ground above the cellar.

According to a further aspect of the present invention, there is provided an accommodation region, comprising one or more cellars arranged in a defined configuration each of the cellars defining a space to be formed under the ground, and each having a ceiling including one or more openings defining an access region for a staircase to connect the ground of the subterranean cellar, when in situ, with the surface of the ground above the cellar.

Preferably the or each of the cellars also includes a heat control device having a heat transfer mechanism to provide heat from the cellar to a region on the ground above the cellar.

In one example a single cellar is provided with plural opening for staircases at different locations such that more than one tent or tepee is able to share a single cellar. In this case, if, say, a rectangular cellar is used with openings in the roof or ceiling at, each of the four corners it is possible for four tepees or tents to have access to the same common cellar.

Embodiments of the present invention will now be described in detail with reference to the accompanying drawings, in which:

FIG. 1 shows a schematic cross-section through a first example of a building assembly according to a particular non-limiting embodiment of the present invention.

Figure 1:
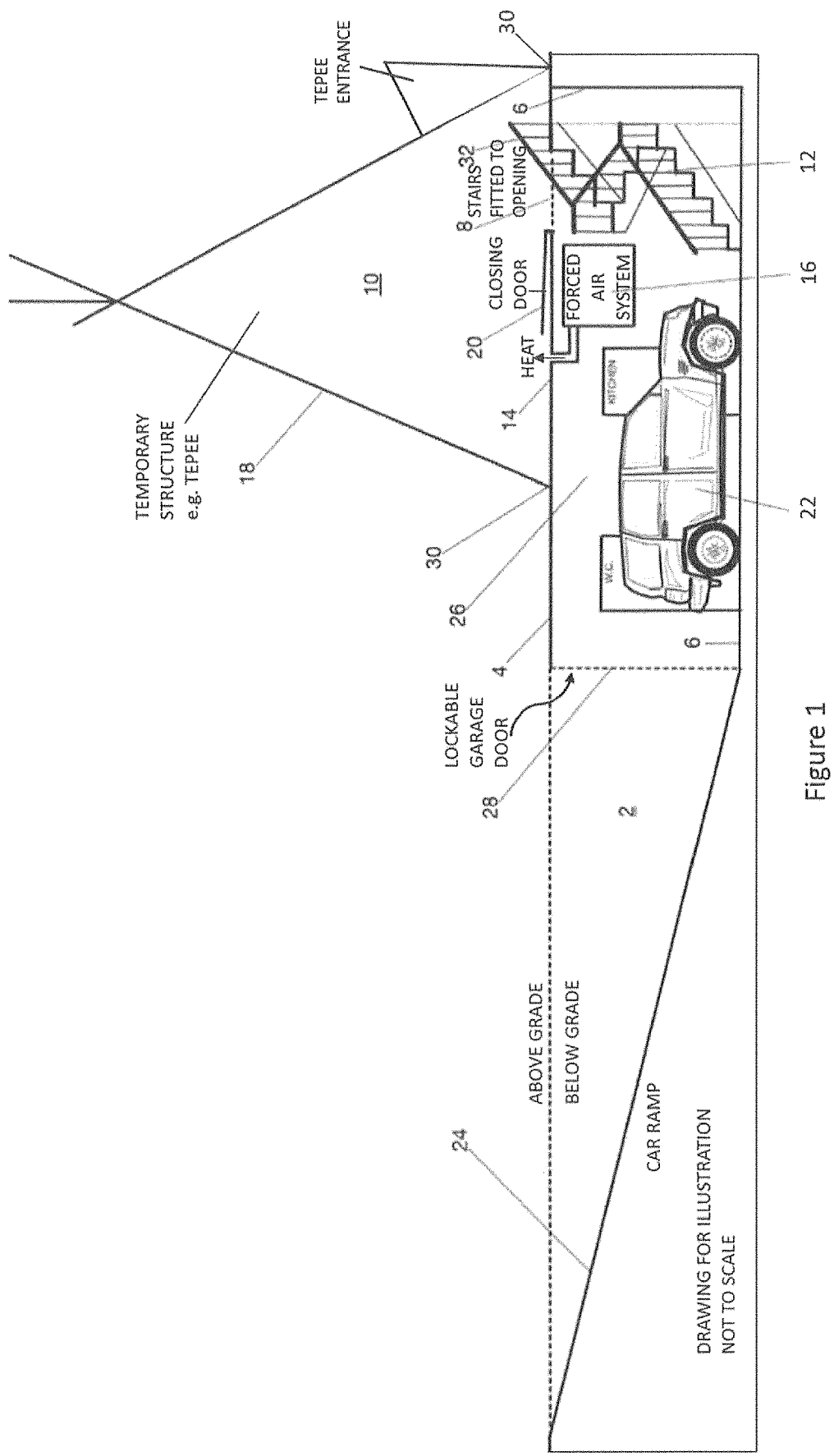
FIG. 1 is a schematic cross-section through a first example of a building assembly.

The building assembly comprises a generally underground cellar region 2. The cellar region is built and constructed such that it comprises a ceiling 4 generally at ground level. The ceiling forms a base or location 5 upon which a tent might be positioned. As will be explained below the base is preferably provided with a number of features that facilitate the construction of a tent on it. In addition, other features may be provided that have the function of providing or enabling storage for camping equipment.

The cellar further has construction panels and flooring 6 which define a frame and provide physical robustness to the cellar. The frame may be formed of prefabricated panels arranged within an excavated region that serve to define the volume and shape of the cellar. It will be appreciated that the precise construction materials and shape of the cellar can be varied without departing from the scope of the present disclosure.

In one example, the ceiling of the cellar (forming the base 5 of the location where a tent might be positioned) is constructed of steel-reinforced concrete having defined openings or areas (not shown) for receiving custom-designed and manufactured tent poles and other structural devices. The shaping of the openings is such that the tent poles or other structural devices can be easily slotted. In one example, the base 5 is constructed to incorporate permanent infrastructure such as poles to minimize any movement or set up issues—potentially incorporating cable and pulley system and rails to guide external fabric or small hard or flexible components (e.g. bendable tent poles) like collapsible tent pole sections that could be joined to collapse and stretch like fabric on the structure.

In one example, the base 5 has a region 7, defined within the base, such as a formed recess shaped to incorporate a storage container that can hold a tent that can be easily collapsed, folded and stored in situ but protected from elements.

In one embodiment, the base is fire proofed and includes a filtration system to enable the underground cellar 2 to provide shelter in areas of extreme weather e.g. hurricanes on the US east coast and forest fires on the US west coast.

In one preferred embodiment, the system is provided as "off the grid". In other words, it is disconnected from utility service providers. In this example, the tent or temporary structure that is erected on the base 5, preferably has solar fabric tent construction or has an array of small solar panels affixed to the fabric of the tent, together with a rechargeable battery in the cellar to store electricity for use at a later time by people staying in the tent.

In a further example, a water well and a composting toilet are provided which further support the off-the-grid nature of an embodiment.

In one example, a tent construction is used that incorporates inflatable support structures such as inflatable tent poles or panels. This enables the tent to be inflated by an air pump such as a powered air pump. This facilitates the putting up of the tent.

Typically, it is expected that the cellar will be constructed by either:
1) digging a hole to specified design dimensions and inserting a custom designed and pre-fabricated 'form' to enable concrete to be poured between the form and earth to create walls of cellar (reinforced with steel), or
2) a custom designed pre-engineered, pre-fabricated, non-corroding structure will be inserted and assembled in place to create the walls and ceiling of the cellar with other pre-fabricated components slotting into the structure to enable fast kit construction of entire cellar.

Preferably, an external waterproofing membrane and French drain system is provided to help ensure that the inside of the cellar remains as dry as possible.

It will be appreciated that the cellar can act as storage to enable camps to be set up during summer season and everything to be packed away in the cellar to be protected from elements in winter season and enable season-to-season storage of the entire camp. This has the further advantage that a user will not need to store significant amounts of camping equipment at home as it can all be stored effectively on site, without affecting the feeling of exposure to the wilderness experienced by a user when camping.

Referring again to FIG. 1, as can be seen, a first opening 8 is provided within the ceiling 4 which enables access from the floor 6 of the cellar to a region 10 above the cellar. A staircase 12 is provided as part of the building assembly. A second opening 14 is provided in the ceiling 4 of the cellar assembly 2. The second opening 14 is arranged in communication with a heat transfer system 16 provided within the cellar 2. The heat transfer system 16 is arranged to provide heat via the opening 14 to the region 10 above the ceiling 4 of the cellar 2.

In use, a tent 18 may be pitched on the ground immediately above the ceiling 4 of the cellar 2. The openings 8 and 14 will therefor lead into the tent 18 when pitched in position appropriately.

A hinged or sliding door mechanism 20 is provided enabling separation of the physical spaces between the interior of the tent 18 and the cellar 2.

The heat transfer system 16 is arranged to provide heat through the ceiling 4 into the region 10 above the ceiling 4. When a tent such as tepee 18 is pitched on the ground in the region above the ceiling 4, then the heat transfer system 16 acts as a heating mechanism for the tent. This is useful when a user is camping during cold weather. Indeed, as explained above it provides a means of making camping during cold weather possible and convenient in a way not previously achievable. Whilst it may have been possible to provide a heater within a tent such an arrangement generates risks such as inadvertent fire. This is particularly dangerous in a tent which defines a relatively small space that will typically be occupied by more than one person. The system effectively provides what might be considered domestic or home comforts within a camping environment whilst avoiding the dangers or risks associated with fires or heaters in small spaces.

In one example the fabric of the tent or tepee is formed of a solar material so as to function as a power source during daylight. The power generated is preferably either used as required when produced or stored in an underground power storage facility such as a rechargeable battery.

Referring again to FIG. 1, within the underground space defined by the cellar 2, there are optionally provided some utilities such as toilet and bathroom facilities and kitchen facilities.

In addition, the cellar 2 comprises a space for the parking of a vehicle such as a car 22. This has the advantage that a user may park their car in the space within the cellar which will then not be visible to campers who are using the tent. Indeed, once the car is parked underground and the users have entered the tent, there is no external evidence of the presence of the car at all.

The closing door 20 can be arranged to be a waterproof door mechanism such that when it is closed, no water can pass from the floor region of the tent 18 to the cellar 2. This is important since it enables removal of the tent 18, closing of the door and then temporary abandonment of the site when a user does not wish to use it.

A ramp 24 is provided, formed within the ground and providing access to the space 26 within the cellar 2. The ramp can be surfaced with grass or an appropriately coloured covering such that it does not detract from the natural looking environment. In addition, a lockable door 28 is provided which can also be coloured or coated appropriately so as not to appear to be "manmade" and therefore will not affect the local environment from the perspective of a user. In one example a fence such as a transparent Perspex or glass fence is arranged around the perimeter of the ramp generally at ground level, so as to minimise the chance of someone or something inadvertently falling into the recess of the ramp.

In one example, the fence is collapsible and functions as a ramp door or cover when in a collapsed configuration. Thus, the ramp doors are provided in the form of two side barriers that are sized and arranged so as to cover the ramp hole when closed. To open the ramp the doors or flaps are pushed open and in the open configuration define a fence or barrier for (at least) the two longitudinal sides of the ramp hole at ground level.

In a preferred embodiment, marks 30 are provided on the ground which provide an indication to a user as to the positioning of the tent with respect to the openings 8 and 14 provided in the ceiling 4 of the cellar 2. The marks may be short posts or fixed anchors defining registration points for corners of a tent. This means that a user can quickly and without knowledge of the layout of the cellar, correctly and appropriately arrange a tent on the area above the cellar.

In one example, hard sidings are provided for forming a low internal wall perimeter around which the base of the tent or teepee may be arranged. The sidings are provided with features to enable engagement with the marks 30. The engagement features might be holes arranged to fit over the marks 30 or they might be metallic or flexible hoops to engage with the marks. Typically, the sidings are provided as planks formed of a light and non-corrosive material such as aluminum or some polymer, or a coated metal that when in place serve to define a barrier generally along the ground between poles of the tent or teepee. The planks might be anything from 10 cm to 60 cm wide and barrier will act to stop or reduce drafts and the ease with which insects or pests might be able to enter the tent or teepee. In cross section the planks are generally longitudinal but in one example they are L-shaped to define a bottom corner of the tent or teepee when assembled.

Preferably, the planks are provided with a rubber or a compressible water-resistant edge that in use forms a seal with the ground. In one example, an optional internal flap/skirt of material is arranged to descend from an internal wall of the tent or teepee to connect to the hard barrier. The skirt could be fully sealed around its engagement with the sidings and sealed at points circumferentially such as to ensure that the tent or teepee is substantially impenetrable to insect and pests.

In one example, the holes or hoops are configured to provide conduit for electricity into the tent (i.e. a cable can be routed through it) so that each pole when in position would have power supply, and could be used as a source of light, e.g. with LCD light. In one example the holes in the sidings are used as vent holes through which a forced venting of air is arranged to pass.

It will be appreciated that any form of heating system 16 can be used so as to provide heat to the space 10 within a tent. A particularly preferred example is a forced air system which provides a flow of hot air into the tent 18. Any suitable alternative can also be used. In the example shown in FIG. 1, it is preferred that utilities are permanently connected to the space 2 within the cellar so as to ensure correct functioning of the toilet and kitchen.

In a further example, an "off-the-grid" embodiment is provided. In this example, a chemical bio-toilet is provided and energy generation storage such as solar panels are provided integrated into the walls of the tent or temporary structure provided above the ground. Furthermore, water heating may be provided by use of a circulation system drive (not shown) arranged in an area where a ground fire will, in use, be provided. A hot water tank is provided for containing the hot water generated in this way and storing for further use.

The building assembly comprises a staircase 12 which, in the example shown, includes a handrail or banister 32 that extends above the ground and into the space 10 within the tent. In one example, the banister is collapsible such that when the door 20 is closed, the banister does not protrude into the volume of the tent 18. The staircase and bannister may be made of a suitable material such as wood, metal, composite or any other suitable material.

The inventor has recognised that the provision of a heat transfer mechanism to provide a means for transferring heat from an area below the ground to an area above the ground enables the building assembly to operate effectively. The provision of such a heat transfer system is counter intuitive but means that the area above the cellar is a suitable position for a tent be positioned.

Positioned near the building assembly is preferably one or more of a fire pit region for having a campfire, a seating zone including seats for users to relax in, a hot tub or swimming pool. Each of these is preferably provided with a cover to make them substantially not noticeable when not in use.

Figure 2:
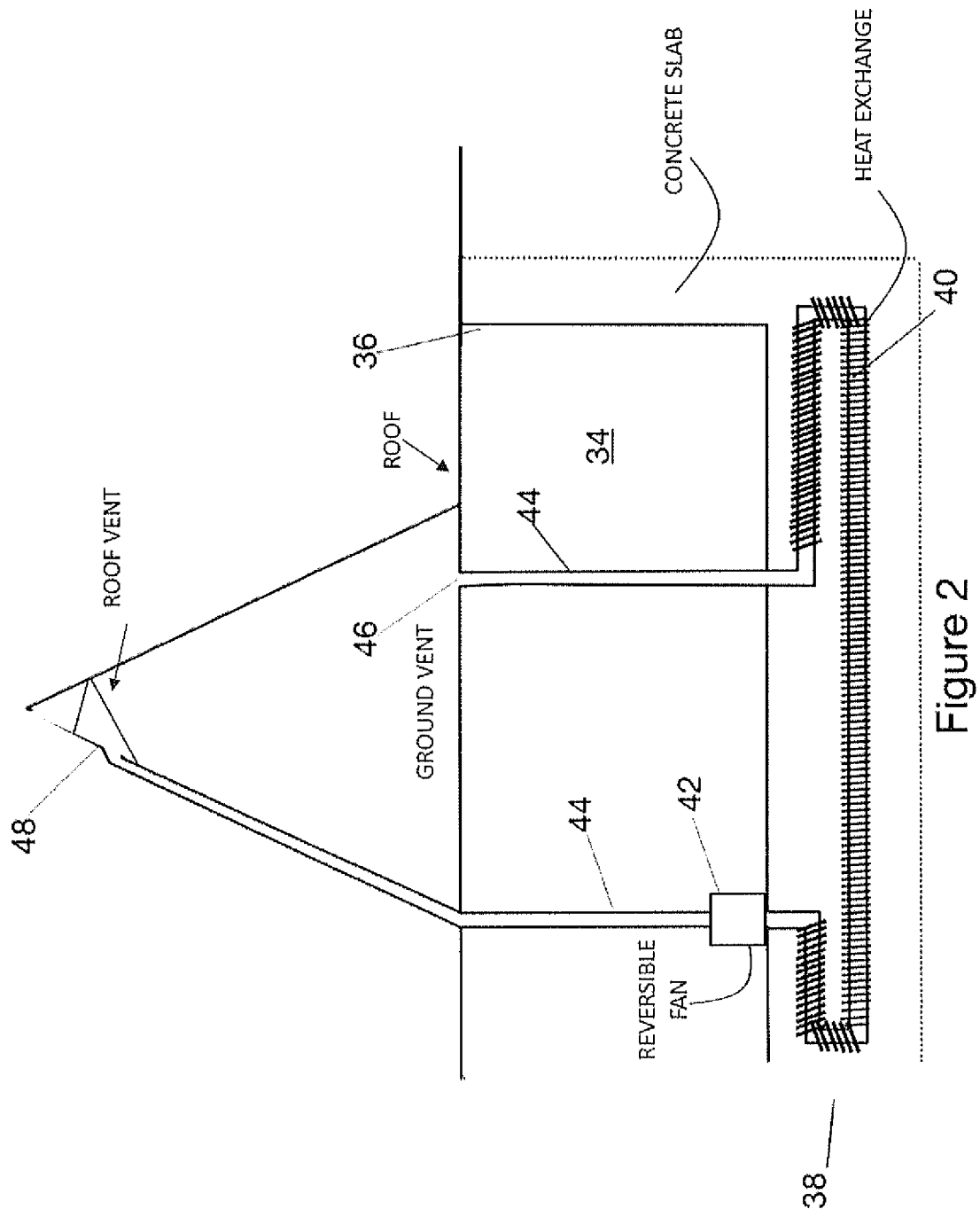
FIG. 2 is a schematic cross-section through a second example of a building assembly.

FIG. 2 is a schematic cross-section through a second example of a building assembly. A number of such as those shown in and described above with reference to FIG. 1 are not included for clarity but it will be appreciated that any or all of them could be included in the example of FIG. 2.

As can be seen a cellar 34 is provided. In this example the cellar is formed of walls 36 that may be formed of metal or concrete or some other appropriate material. A heat exchange system 38 is provided in the form of a heat exchange network 40 formed within a concrete floor or alternatively that could be formed instead (or as well) in the ground itself. A reversible fan 42 is provided coupled in line with one or more conduits 44 arranged to enable air to be moved controllably in either direction through the heat exchange network 40. A ground vent 46 and a roof vent 48 are provided which enable air to be provided to the space within the tent or tepee as desired. Preferably the fan is battery powered. The battery may be charged by solar power generated electricity.

Figure 3:
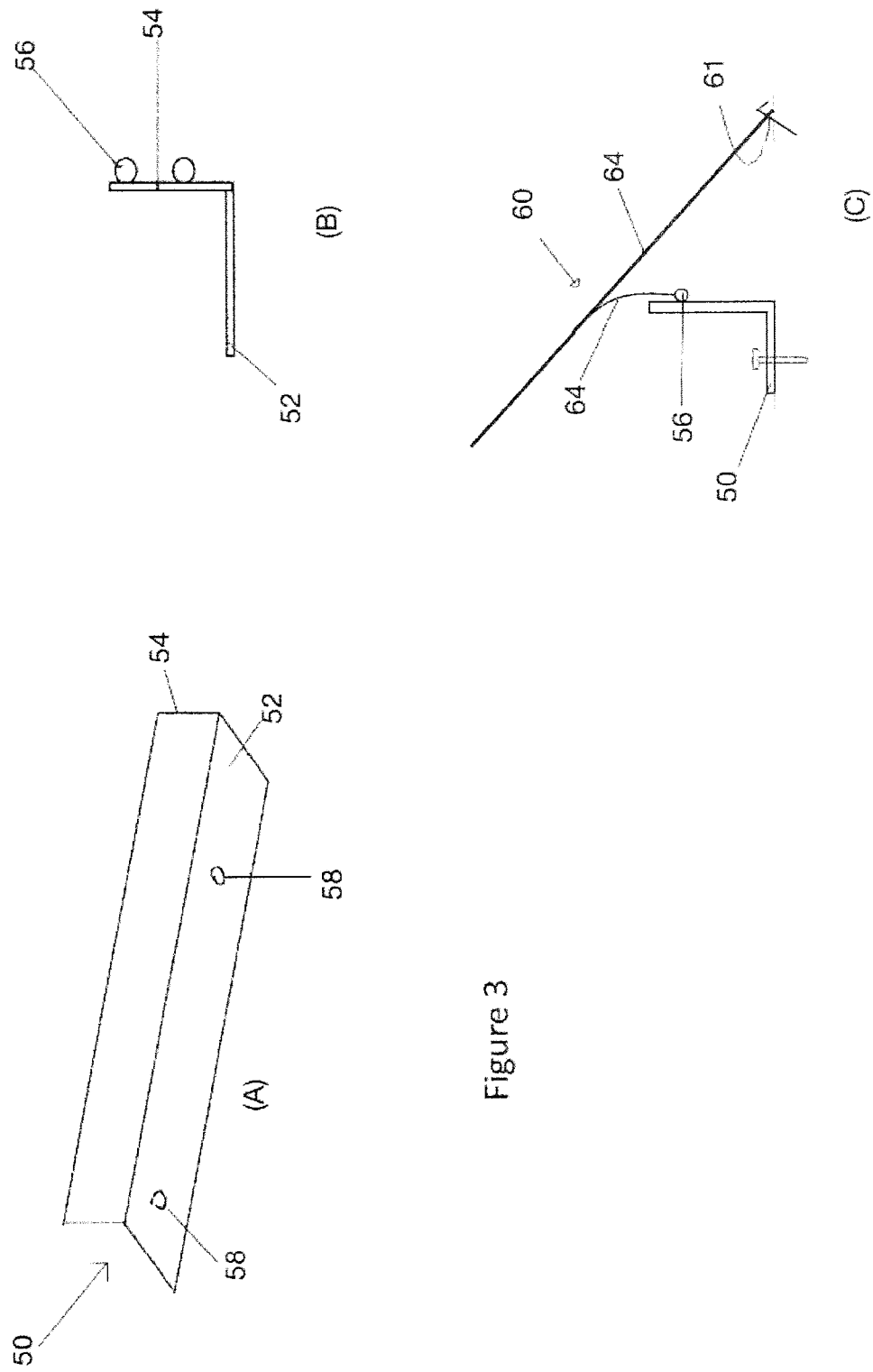
FIGS. 3A to 3C show examples of a siding for use, or in the case of FIG. 3C in use, in a building assembly.

As referred to above it is preferable that in some examples, that sidings be provided in the form of hard sidings made of a hard material. FIG. 3 shows an example of such a siding. In this example the siding 50 has an L-shape cross section as seen most clearly in FIG. 3B. The siding 50 has a first part 52 that will be arranged flat on the ground and a second upstanding part 54. The upstanding part 54 has hoops 56 in this example arranged to be in a vertical plane. The marks or posts 30 are configured to engage with the hoops so as to fix the position of the siding. The hoops can also be used as anchor points for ropes or cables from the tent or tepee.

In FIG. 3A there are visible openings 58 which can be used to provide anchor points for pegs or stakes or to engage with the marks 30 described above. Preferably each siding has both the openings 58 and the hoops 56.

A water or rust resistant coating can be provided on all or some of the surfaces of the sidings. In one example the sidings are made of a material which is itself water resistant.

In one example only the edges of the sidings or planks are provided with a rubber or a compressible water-resistant edge that in use forms a seal with the ground. As explained above, an optional internal flap/skirt of material of the tent is arranged to descend from an internal wall of the tent or teepee to connect to the hard barrier. The skirt could be fully sealed around its engagement with the sidings and sealed at points circumferentially such as to ensure that the tent or teepee is substantially impenetrable to insect and pests.

As seen in FIG. 3C the siding 50 is in situ within a tent 60. A conventional tent peg 61 is used at the outer layer of material 62 and a skirt 64 hangs from the inner wall of the tent to connect with the hoops 56 of the siding 50 thus forming a barrier. The positioning of the skirt can be varied so as. For example, to conceal from an individual within the tent, the presence of the siding 50.

Figure 5:
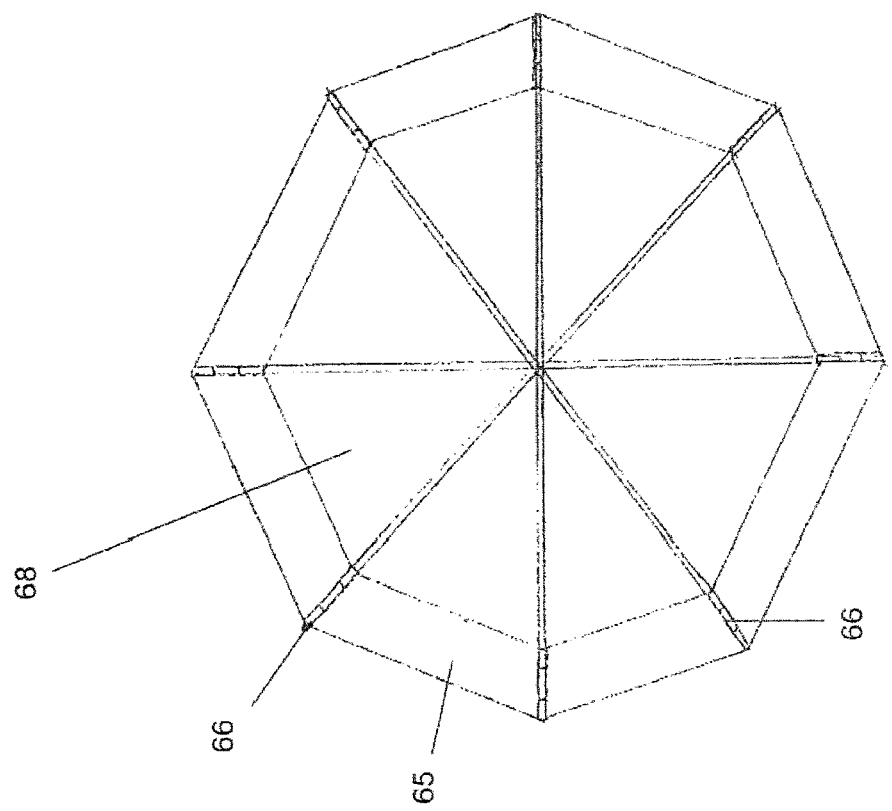
FIG. 5 shows a plan view of a tepee including sidings such as those of FIG. 4.
Figure 4:
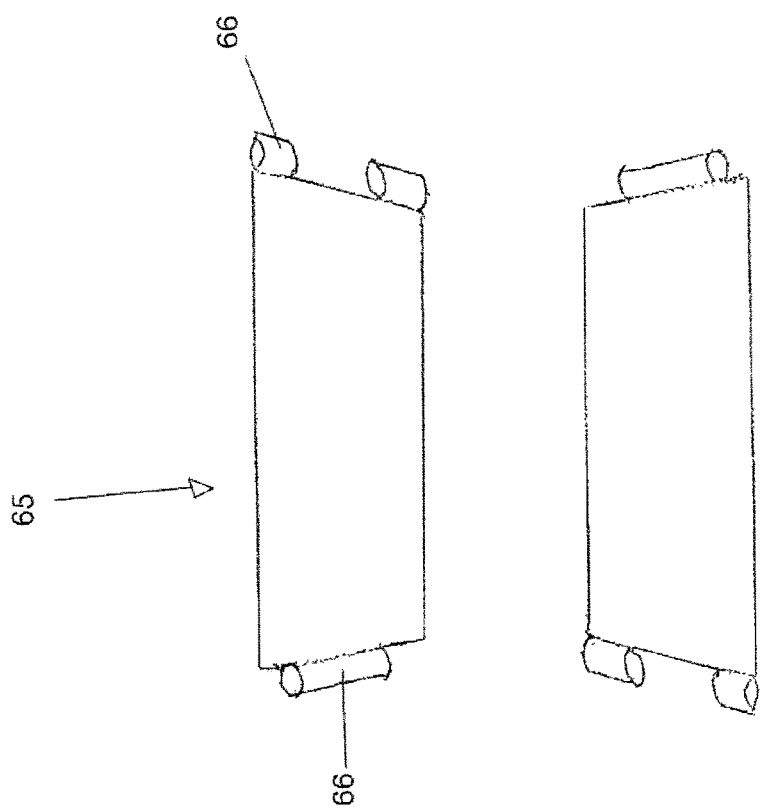
FIG. 4 shows an example of 2 sidings for use in the building assembly.
Figure 7:
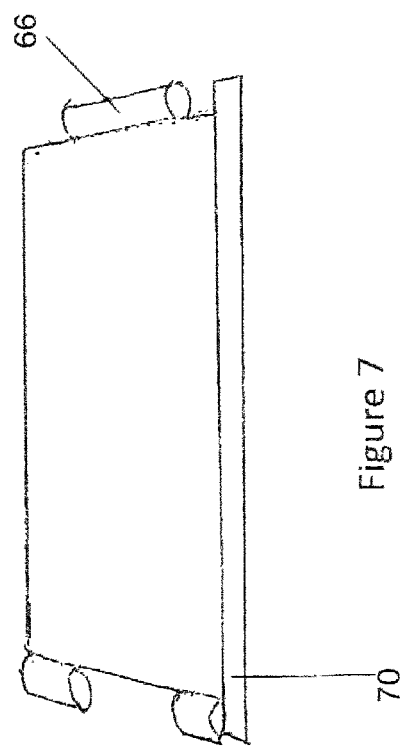
FIG. 7 shows an example of 2 sidings for use in the building assembly.
Figure 6:
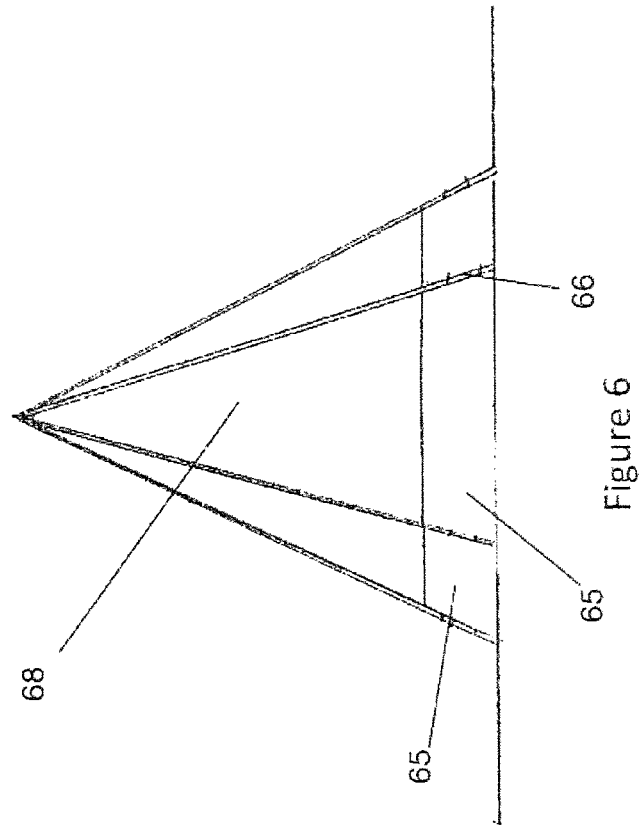
FIG. 6 shows a side view of a tepee including sidings such as those of FIG. 4.

FIG. 4 shows an example of 2 sidings for use in the building assembly. As can be seen in this example, the siding 65 is substantially planar with cylindrical side pieces 66 for engagement either with a mark 30 provided for the building assembly and/or for a pole of the tent or tepee. In FIGS. 5 and 6, show respectively in plan view and side view a tepee 68. Sidings arranged on each side of the tepee thereby forming a barrier to entry for small animals and the like.

FIG. 6 shows another example of a siding. In this case a strip of water repellent and/or flexible material is provided. It will be appreciated that in use this strip is arranged so as to be in contact with the ground and thereby define the barrier referred to above.

In a further embodiment, there is provided an accommodation region, comprising one or more (preferably plural) cellars arranged in a defined configuration each of the cellars defining a space to be formed under the ground, and each having a ceiling including a first opening defining an access region for a staircase to connect the ground of the subterranean cellar, when in situ, with the surface of the ground above the cellar. Thus, what in effect is provided is the cellar region of what could be, with tents in place, a campsite for multiple tents. When no tents are there the area will look like any ordinary field subject to the possible presence of small marks 30 or the like, but in practice the area will look entirely unspoilt.

In one example a single cellar is provided with plural opening for staircases at different locations such that more than one tent or tepee is able to share a single cellar. In this case, if a rectangular cellar is used with openings in the roof or ceiling at, say each of the four corners it is possible for four tepees to have access to the same common cellar.

This is particularly case if the ramps are positioned in such a way that they cannot be viewed from an approach e.g. a passing road, and/or if the they are provided with doors or covers. As explained above, in one example, a protective fence may be collapsible and functions as a ramp door or cover when in a collapsed configuration. In one preferred example it is coloured naturally to bend in with surrounding. For example, it could be green if on a green field site which is likely for a campsite. In one example a material such as artificial grass is used on the cover so that when closed it will blend into to a field in which it might be arranged.

Embodiments of the present invention have been described with particular reference to the examples illustrated. However, it will be appreciated that variations and modifications may be made to the examples described within the scope of the present invention.

The invention claimed is:

1. A building assembly, comprising:
   a subterranean cellar defining a space to be formed under the ground, the cellar having a ceiling including:
   a first opening defining an access region for a staircase to connect the ground of the subterranean cellar, when in situ, with the surface of the ground above the cellar;
   a heat control device having a heat transfer mechanism to provide heat from the cellar to a region on the ground above the cellar; and
   kitchen facilities provided within the cellar; and
   a tent configured to be arranged on the ground above the cellar when in situ.

2. The building assembly of claim 1, comprising a staircase that extends from a floor of the cellar to the first opening thereby enabling a user to climb between the cellar and the ground surface above.

3. The building assembly of claim 1, wherein the heat control device comprises a hot air or hot water supply system.

4. The building assembly of claim 1, wherein the cellar is formed of a frame itself including prefabricated panels for easy assembly on an excavated site.

5. The building assembly of claim 1, wherein the tent has a ground sheet with an opening providing access to the staircase.

6. The building assembly of claim 1, wherein the heat control device includes a heat exchanger.

7. The building assembly of claim 6, wherein the heat exchanger is a ground-based heat exchanger.

8. The building assembly of claim 1, wherein the heat control device includes a reversible fan.

9. A building assembly comprising:
a subterranean cellar defining a space to be formed under the ground, the cellar having a ceiling including:
a first opening defining an access region for a staircase to connect the ground of the subterranean cellar, when in situ, with the surface of the ground above the cellar;
a heat control device having a heat transfer mechanism to provide heat from the cellar to a region on the ground above the cellar; and
bathroom facilities provided within the cellar; and
a tent configured to be arranged on the ground above the cellar when in situ.

10. A building assembly of claim 1, comprising:
a subterranean cellar defining a space to be formed under the ground, the cellar having a ceiling including:
a first opening defining an access region for a staircase to connect the ground of the subterranean cellar, when in situ, with the surface of the ground above the cellar;
a heat control device having a heat transfer mechanism to provide heat from the cellar to a region on the ground above the cellar; and
an upper staircase access frame, defining the access region for the staircase; and
a tent configured to be arranged on the ground above the cellar when in situ.

11. An accommodation region, comprising one or more building assemblies according to claim 4 arranged in a defined configuration.

12. A method of enabling camping, the method comprising:
providing a building assembly according to claim 10.

13. A building assembly comprising:
a subterranean cellar defining a space to be formed under the ground, the cellar having a ceiling including:
a first opening defining an access region for a staircase to connect the ground of the subterranean cellar, when in situ, with the surface of the ground above the cellar; and
a heat control device having a heat transfer mechanism to provide heat from the cellar to a region on the ground above the cellar;
a tent configured to be arranged on the ground above the cellar when in situ; and
a siding to define an edge of the tent.

14. The building assembly of claim 13, wherein at least part of the siding is water resistant.

15. The building assembly of claim 13, wherein the siding is formed of a water-resistant material.

16. The building assembly of claim 14, wherein the siding is formed of a metal at least part coated in a water-resistant material.

17. The building assembly of claim 14, wherein the siding is a planar sheet having one or more connectors arranged on it.

18. A building assembly comprising:
a subterranean cellar defining a space to be formed under the ground, the cellar having a ceiling including:
a first opening defining an access region for a staircase to connect the ground of the subterranean cellar, when in situ, with the surface of the ground above the cellar; and
a heat control device having a heat transfer mechanism to provide heat from the cellar to a region on the ground above the cellar;
a tent configured to be arranged on the ground above the cellar when in situ, wherein the tent has a ground sheet with an opening providing access to the staircase;
a siding to define an edge of the tent, wherein at least part of the siding is water resistant, wherein the siding is a planar sheet having one or more connectors arranged on it, and wherein the sheet is substantially rectangular and comprises a strip of flexible material along one of its longitudinal sides.

19. A building assembly, comprising:
a subterranean cellar defining a space to be formed under the ground, wherein the cellar has a ceiling comprising a first opening defining an access region for a staircase to connect the ground of the subterranean cellar, when in situ, with the surface of the ground above the cellar;
an upper staircase access frame that defines the access region for the staircase; and
a tent configured to be arranged on the ground above the cellar when in situ, wherein the cellar comprises a space for parking a vehicle.

* * * * *